United States Patent [19]

Olbrich et al.

[11] 4,053,975
[45] Oct. 18, 1977

[54] METHOD OF MAKING A SELF-SUPPORTING WIRE COIL

[75] Inventors: Otto Olbrich, Munich; Wilhelm Brand, Neubaldham, both of Germany

[73] Assignee: Siemens Aktiengesellschaft, Berlin & Munich, Germany

[21] Appl. No.: 719,165

[22] Filed: Aug. 31, 1976

[30] Foreign Application Priority Data

Sept. 15, 1975 Germany .................... 2541084

[51] Int. Cl.² .................... H02K 15/04; H01F 41/06
[52] U.S. Cl. .................... 29/596; 29/594; 29/605; 179/115.5 VC; 310/13; 310/27; 335/222; 336/205
[58] Field of Search .................... 29/605, 594, 596; 179/115.5 VC, 115.5 R; 310/13, 27; 335/222; 336/205, 206

[56] References Cited

U.S. PATENT DOCUMENTS 3,182,384  5/1965  Carlson et al. .................... 29/605
3,194,992  7/1965  Brown .................... 310/27
3,273,226  9/1966  Brous et al. .................... 29/605 X

FOREIGN PATENT DOCUMENTS 1,119,992  12/1961  Germany .................... 310/27

Primary Examiner—Carl E. Hall
Attorney, Agent, or Firm—Hill, Gross, Simpson, Van Santen, Steadman, Chiara & Simpson

[57] ABSTRACT

A wire is wound on a coil body form about a removable mandrel in a first layer in which the turns abut one another. A guide ring reverses the direction of lead of the wire to form a second, overlying layer in which the turns are spaced a short distance apart from one another. The final turns of the outer layer engage about the coil form. A casting agent applied to the coil penetrates the turns of the second and first layers and is hardened. The mandrel is removed and the coil is self-supporting, for use as in a moving-coil motor. A fiberglass sheet may optionally be applied about the first layer before the second layer is wound thereover to increase the strength of the coil.

10 Claims, 8 Drawing Figures

METHOD OF MAKING A SELF-SUPPORTING WIRE COIL

BACKGROUND OF THE INVENTION

1. Field of the Invention

The present invention relates to a method and apparatus for the production of a coil which is self-supporting over its principal length.

2. The Prior Art

Coils which are self-supporting in the winding area have various uses, as in moving coils in moving-coil motors. In such applications the mass in motion and the size of the permanent magnet in the motor should be as small as possible. Where the air gap about the moving coil is in such cases to be small, the winding zone of the coil must be built to close tolerances, yet it is expedient to dispense with a coil-supporting body in the winding area. Thus, it is desirable to provide a method and an apparatus for constructing a self-supporting coil which is both simple and inexpensive to produce. Once the coil is wound, the well-known drip method is employed for casting together the layers of the coil, for instance using a resinous material as a drip or casting agent.

SUMMARY OF THE INVENTION

A method and an apparatus are disclosed for producing a wire coil which is self-supporting over at least a principal part of its length. Either a single or a double strand of wire in parallel is wound in a first annular layer of abutting turns about a mandrel form with a uniform lead in a first direction. The first layer of turns extends from an edge of a coil body, the edge being adapted to the diameter of the wire and hence the lead of the turns. At the end of the first layer, a guide ring is employed to abut the last turn in the inner layer and to redirect the wire upwardly in a reverse lead direction. A spacing roller with peripheral channels is employed to wind the wire turns tightly upon the inner layer and to space them slightly apart axially of the coil. The outer layer is wound onto a collar on the coil body to form a strong mechanical bond.

A casting agent is applied to the outside of the second layer, the agent penetrating about and between the turns of the second and first layers of the coil, apparently by suction or capillary action, before hardening. The spacing of the turns of the outer layer permits penetration of the drip agent through the outer layer, while the abutting wires of the inner layer permit resin flow just beyond the lines of contact between the turns of wire.

The leads of the inner and outer layers of wire are established respectively by an edge of a collar or ledge on the coil body and by a guide ring pressed axially onto the last turn of the inner layer and which guides the wire into a reverse lead at a radially outward point at the opposite end of the coil from the coil body. A mandrel employed to support the windings of the coil before the casting step is removable from within the coil, to leave the coil self-supporting.

DESCRIPTION OF THE PREFERRED EMBODIMENTS

Figure 1:
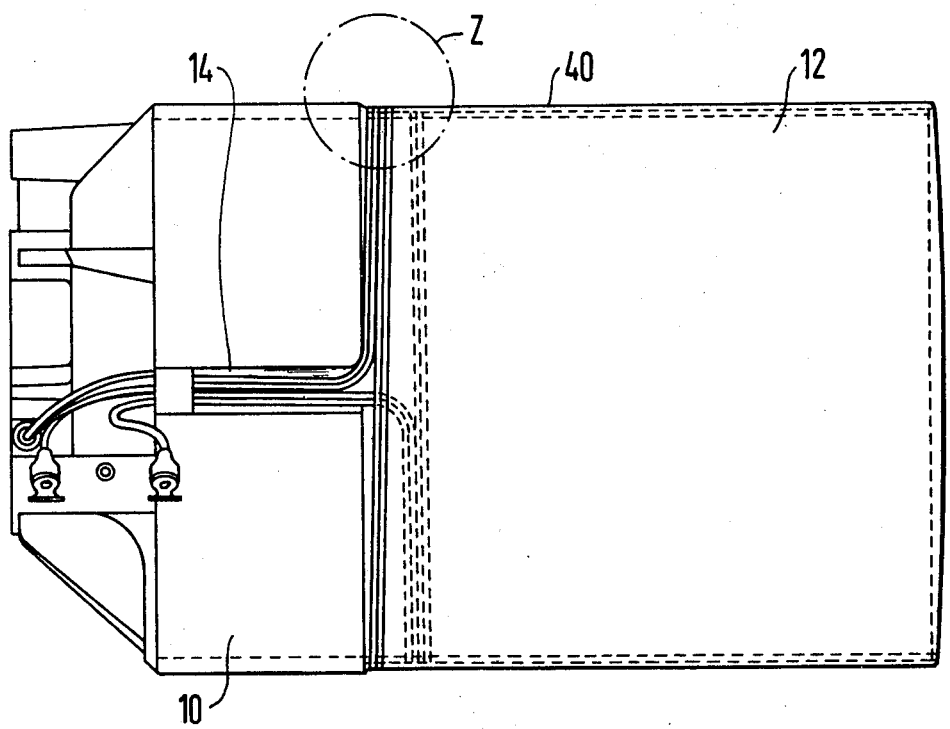
FIG. 1 is a side elevational view of an assembled coil in accordance with the invention.
Figure 2:
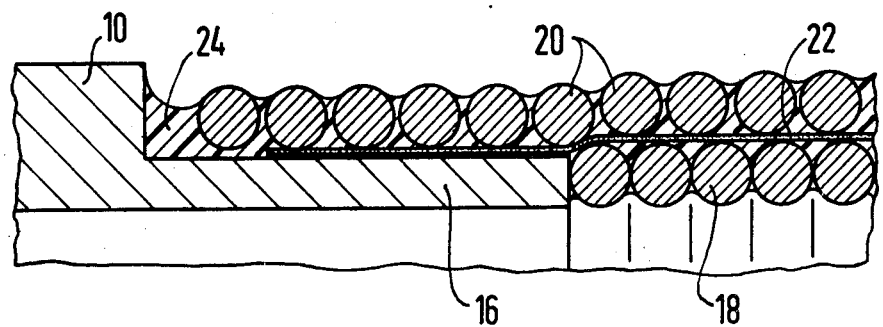
FIG. 2 is a side, sectional view taken at point Z on FIG. 1.

FIG. 1 shows in partly schematic form a coil body 10 which carries a coil or winding 12 which is, aside from some coil body support, self-supporting. As shown in FIGS. 1 and 2, the coil 12 comprises two layers of wires supported from a collar 16 on one side of the coil body 10. Wires from the coils 12 connect to voltage and current sources through a groove 14 formed on one side of the coil body 10. In FIG. 1, the coil is wound in pairs of wires, as shown by the leads running through the groove 14.

FIG. 2 is an enlarged, sectional view of the area Z in FIG. 1. The ledge or collar 16 extends from the coil body 10 in the axial direction. The first turn of an inner or first layer 18 of the winding 12 abuts a rightward edge of the collar 16. As shown in FIG. 2, the turns of the inner layer 18 are wound to lie tightly together. An outer layer 20 overlies the inner layer 18, having the individual turns thereof spaced slightly apart from one another. A woven glass fiber sheet 22 is preferably laid between the outer layer 20 and the inner layer 18 to stiffen the coil. The woven glass fiber 22 preferably also is cemented firmly directly onto the collar 16, as shown. The outer layer 20 is then wound onto and about the collar or ledge 16 for increased strength of the winding 12.

The individual turns of the outer layer 20 have a fixed spacing from one another, so that a casting agent shown in finished form at 24 in FIG. 2 can penetrate therebetween. The agent is preferably an epoxy resin which can be dripped in liquid form onto the windings 12 as at 40 in FIG. 1. The drip or castng agent 24 reaches the inner layer 18 between the turns and by a capillary or suction action between the turns of the layer 18 penetrates just beyond the contact points between the turns of the inner layer 18. In this way the inner and outer layers 18, 20 are bonded together by the agent 24 with the added stengthening of the woven glass fiber sheet 22 therebetween.

Figure 3:
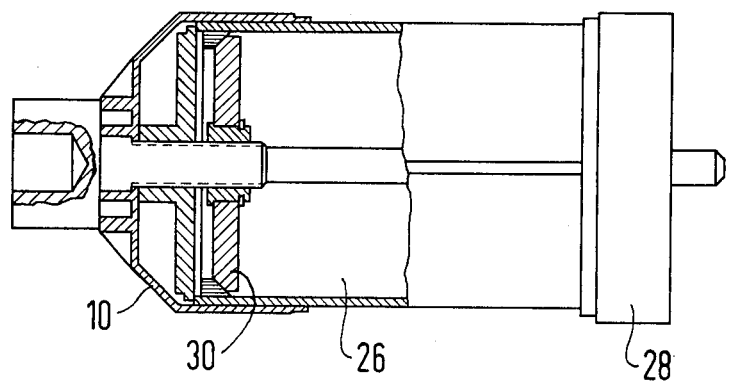
FIG. 3 is a side elevational view, partly broken away and in section, of an apparatus employed to construct a coil in accordance with the invention.

Production of the coil employs, as shown in FIG. 3, an internal winding mandrel 26 which may consist of separable segments fixed in place during winding and casting of the coil but readily removable thereafter. The mandrel permits production of a precisely cylindrical coil or, where required, a coil of any other convex annular shape. The coil body 10 is received on the mandrel 26 at one side thereof. A guide ring 28 is received over the mandrel at an opposite end. Segments of the mandrel 26 are spread radially to engage the interior surface of the coil body 10 and the guide ring 28 as by means of a cone plate assembly 30. The cone plate 30 permits removal of the coil, when completed, from the winding mandrel 26.

Figure 4:
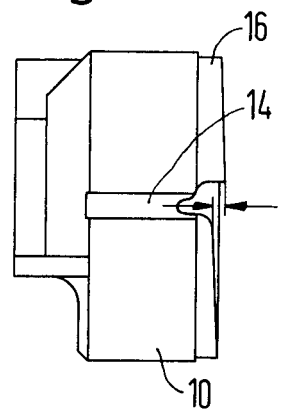
FIG. 4 is a side elevational view of a coil body.

In winding the coil, a single or double strand of wire is brought through the groove 14 of the coil body 10, as shown in FIG. 4, and is led downwardly about the coil body 10 in the orientation of FIG. 4 abutting the edge thereof. The collar or ledge 16 is machined so that a complete revolution of the wire about the coil body 10 will result in an axial displacement thereof by the axial width of the wire or wires being wrapped. In this manner the turns of the wire will closely abut one another while maintaining a uniform lead in accordance with the principles of the invention. That is, the lead of the collar 16 is dependent upon the diameter of the winding wire in the axial direction, as shown by the two arrows of FIG. 4. Where two wires are employed, winding time is halved and a greater angle of intersection between the inner and the outer layers is obtained, simplifying production of the uniform lead in the outer layer. Once winding is completed, two ends of the wires can be connected in series to form a single coil.

The inner or first layer 18 of the coil 12 starts from the edge of the collar 16. The turns of the inner layer 18 are pressed firmly against one another so that no spacing occurs between the turns. Winding continues with a uniform lead in the first direction, for example right-handedly, until a desired coil length is formed. To ensure that the windings of the inner layer do not expand axially, a guide ring 28 is fitted onto the mandrel 26 and pressed firmly, axially against the final turn of the inner layer 18.

Figure 5:
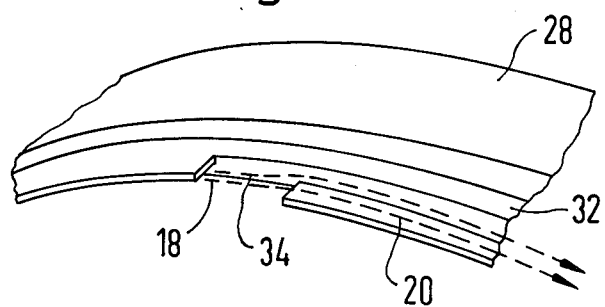
FIG. 5 is a perspective view of a portion of a guide ring of the present invention.
Figure 6:
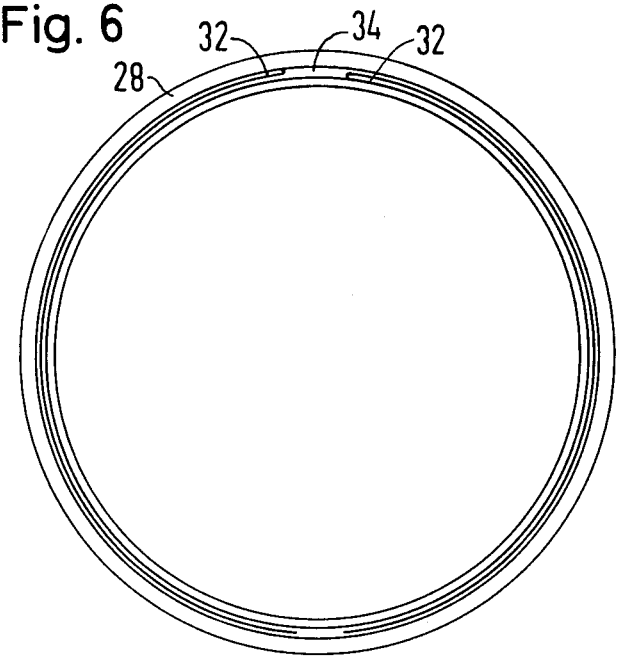
FIG. 6 is a plan view from inside the coil of the guide ring of the invention.
Figure 7:
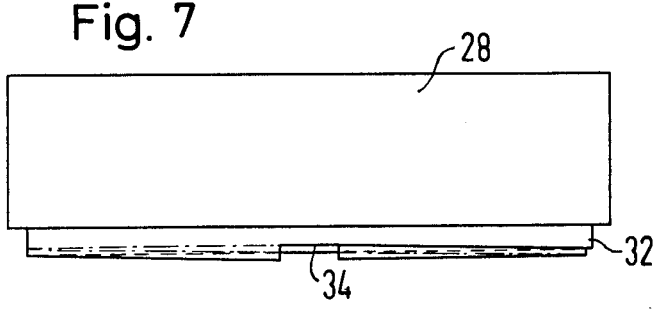
FIG. 7 is a top, plan view of the guide ring.

The guide ring 28 is shown in FIGS. 5, 6, and 7. The guide ring 28 has a collar 32 having a radially inward portion with corresponding parts arranged parallel to, for instance, the right-handed lead of the inner layer 18 and the edge of the collar 16. The guide ring 28 thus will mate precisely with the inner layer 18 of the turns of the winding 12. The wire is then led to a gap 34 in the collar 32 to pass outwardly to begin forming the outer layer 20 of the winding 12. The desired lead direction for the outer winding 20 is also machined into the collar 32 of the guide ring 28, so that the first turn of the outer layer 20 is wound with a lead having a desired angle to the underlying turns of the layer 18. In FIG. 7, the track of the lead for the last turn of the inner layer 18 is shown in a dot-and-dash line and the path of the lead of the first turn of the outer layer is shown in a broken line.

Once the inner layer is secured between the coil body 10 and the guide ring 28, the woven glass fiber sheet 22 is placed in position about the inner layer 18 and is cemented to the flange or collar 16 of the coil body 10. Then winding of the outer layer 20 commences, with a constant spacing of 0.03 to 0.06 mm between the adjacent turns. These spaces are selected to allow for penetration of the casting agent 24 into the windings.

Figure 8:
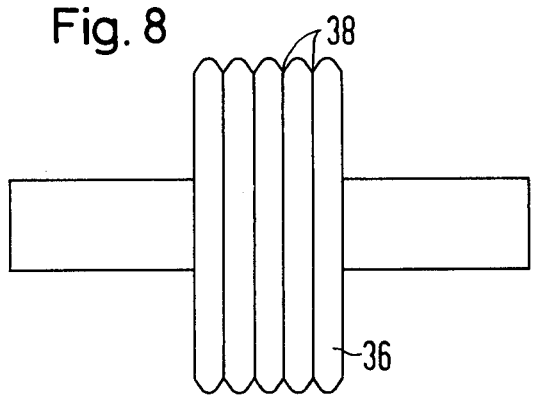
FIG. 8 is a side elevational view of a spacing roller employed in the present invention.

A spacing roller 36 as shown in FIG. 8 is conveniently employed to affect the desired spacing. Channels 38 are formed in the periphery of the spacing roller 36, centers of the individual channels being spaced apart by the wire diameter plus the desired space between the individual turns. More channels than wires being wound are provided, to wind the wire according to the preceding turns to maintain uniformity of the lead and the spacing of the wires. The spacing roller 36 is pressed against the outer winding with a force of about 10N. In the orientation of FIGS. 1 and 8, the winding wire(s) will run into the left-most channels and be pressed between the spacing roller 36 and the fiber mat 22 and/or the inner winding 18. Turns of the outer layer 20 already wound lie in the remaining channels of the spacing roller 36. The outerlayer 20 is wound in this way until the left end of the collar 16 of the coil body 10 is reached, as shown in FIG. 1. The wires are then routed through the groove 14 to the appropriate connections.

Casting of the coil is then accomplished, as by the well-known drip method. The winding mandrel with the finished, wound coil is heated to about 120° C. With the winding mandrel stationary the agent is dripped along an upper-most line 40, as shown in FIG. 1, parallel to the axis of the coil. The agent flows freely under the heat of the winding and so penetrates into the winding very quickly. Application of the casting agent all over the periphery of the coil coats and bonds the windings of the coil. If a uniform surface is desired, excess casting agent may be wiped off the surface while rotating the winding mandrel. Jelling of the drip agent in and about the coil is accelerated by further heating of the coil and the casting agent, with hardening occurring in an oven at about 120° C.

After casting and hardening of the material 24, the winding mandrel and coil are cooled to room temperature. The mandrel 26 is then taken apart by loosening the cone plate 30. The guide ring 28 is released and removed from the end of the coil 12, and then the segments of the mandrel 26 are removed from the interior of the coil. The coil 12 is left cantilevered from the coil body 10 as shown in FIG. 1.

Although the drawings illustrate production of a cylindrical coil, is also possible for coils with other annular shapes to be produced according to the principles disclosed. Although these and various other minor modifications may be suggested by those versed in the art, it should be understood that we wish to embody within the scope of the patent warranted hereon all such modifications as reasonably and properly come within the scope of our contribution of the art.

We claim as our invention:

1. A method of producing a wire coil which is self-supporting over at least a principal part of its length, comprising the steps:
    winding the wire into a first annular layer of axially-abutting turns with a uniform lead in a first direction;
    winding the wire into a second annular layer of turns overlying the first layer and having a lead in a second direction, the turns being spaced slightly apart from one another in a direction axial of the coil formed thereby; and
    applying a casting agent to the coil, whereby the agent penetrates about and between the turns of the second and first layers of the coil before hardening.

2. The method of claim 1, wherein a coil body having an axially-extending annular ledge and a guide ring are employed and wherein the method further comprises:
    winding a first turn of said first layer of said coil abutted against an edge of said ledge;
    after winding said first layer to a desired length, employing said guide ring to reverse said winding direction from said first to said second layers; and
    winding said second layer upon and about said ledge of said coil body.

3. The method of claim 2, wherein the edge of the coil body is formed with a lead and the winding of the first layer is accomplished parallel to this lead.

4. The method of claim 2, wherein the guide ring has a lead thereabout at a radial position of the outer layer and the windng of the second layer is accomplished parallel to this lead.

5. The method of claim 1, further comprising the step of applying a woven glass fiber sheet about the first layer before the second layer is wound thereover.

6. The method of claim 5, wherein a coil body having an axially-extending ledge is employed and the glass fiber sheet is further secured to the ledge of the coil body before the second layer is wound.

7. The method of claim 1, wherein the second layer is applied using a cylindrical spacing roller having at least two channels formed therein, the channels being spaced apart by a width of the wires plus one separation length, and wherein the spacing roller is pressed against the second layer of the coil during winding thereof to assure uniform lead and spacing of the turns thereof.

8. The method of claim 1, wherein the coil is held horizontally and the casting agent is applied to an uppermost part of the coil.

9. The method of claim 1, wherein two adjacent, parallel wires are wound simultaneously into said first and second layers.

10. A method for the production of a self-supporting coil of electrically conductive wire extending from a coil body having an axially-extending collar on one side of the body and employing a mandrel form receivable radially within the collar of the body and extending to one side thereof, comprising the steps:

inserting the mandrel partially into said coil body radially inwardly of said collar;

winding said wire upon said mandrel in a first direction and in a first layer with axially-adjacent turns of said wire abutting one another and a first turn abutting an axial edge of said collar;

winding said wire in a second layer and in a second direction from an end of said first layer and back to and about said collar of the coil body, with axially-adjacent turns of said wire being spaced apart from one another;

depositing a casting agent upon said second layer of wire, whereby said agent penetrates between the turns of second layer and also between the turns of the first layer and hardens; and withdrawing the mandrel from inside the completed coil and coil body, whereby a coil is produced which supports itself in axial relation to the coil body.

* * * * *